US007284586B2

(12) United States Patent
Howland

(10) Patent No.: US 7,284,586 B2
(45) Date of Patent: Oct. 23, 2007

(54) VEHICLE-MOUNTED WHEEL REPAIR PLATFORM

(75) Inventor: David Howland, 1970 Foothill Dr., Vista, CA (US) 92084

(73) Assignee: David Howland, Vista, CA (US)

( * ) Notice: Subject to any disclaimer, the term of this patent is extended or adjusted under 35 U.S.C. 154(b) by 0 days.

(21) Appl. No.: 10/904,826

(22) Filed: Dec. 1, 2004

(65) Prior Publication Data

US 2005/0115772 A1   Jun. 2, 2005

Related U.S. Application Data

(60) Provisional application No. 60/526,713, filed on Dec. 2, 2003.

(51) Int. Cl.
*B60B 30/00* (2006.01)
*B60C 25/00* (2006.01)
*B60C 25/05* (2006.01)

(52) U.S. Cl. .............................. 157/14; 157/17; 157/20; 157/21; 224/400; 224/488; 224/495; 224/499; 224/42.12; 224/42.24; 224/42.26; 224/42.27; 224/42.3

(58) Field of Classification Search .................. 157/14, 157/17, 20, 21; 224/400, 488, 495, 499, 224/42.12, 42.24, 42.26, 42.27, 42.3
See application file for complete search history.

(56) References Cited

U.S. PATENT DOCUMENTS

| 3,074,468 | A | * | 1/1963 | Tarazona | 157/1.24 |
| 4,140,255 | A | | 2/1979 | Weiler | |
| 4,161,267 | A | | 7/1979 | Morrison, Jr. | |
| 4,250,936 | A | | 2/1981 | du Quesne | |
| 5,203,479 | A | | 4/1993 | Lucas | |
| 5,232,035 | A | * | 8/1993 | Adams, Jr. | 157/1.17 |
| 6,662,983 | B2 | * | 12/2003 | Lane et al. | 224/405 |

* cited by examiner

*Primary Examiner*—Joseph J. Hail, III
*Assistant Examiner*—Shantese McDonald
(74) *Attorney, Agent, or Firm*—Clifford B. Perry

(57) ABSTRACT

A vehicle-mounted wheel repair platform includes a vehicle connection assembly, a wheel repair platform assembly, and a wheel securing assembly. The vehicle connection assembly includes a horizontal section having a vehicle attachment port for coupling to a vehicle, and a vertical section connected to the horizontal section. The platform assembly includes a vertically-oriented section configured to engage the vertical section of the vehicle connection assembly, and a wheel platform connected to the vertically-oriented section. The wheel securing assembly is coupled to the wheel platform and operable to secure a wheel to the top surface of the wheel platform.

20 Claims, 6 Drawing Sheets

VEHICLE-MOUNTED WHEEL REPAIR PLATFORM

CROSS REFERENCE TO RELATED APPLICATIONS

This application claims the benefit of priority to U.S. Provisional Application No. 60/526,713, filed Dec. 2, 2003, the contents of which are herein incorporated by reference in its entirety for all purposes

BACKGROUND

The present invention is related to wheel repair apparati, and more particularly to a vehicle-mounted (i.e., attached) wheel repair platform.

Wheel repair in general, and tire changing in particular is an inconvenient and time-consuming process known to most people who own or operate vehicles. The process typically involves removing the offending wheel from the vehicle and subsequently performing the repairs, for example, patching or changing a flat tire. The repaired or replaced tire is inflated and re-installed, and the vehicle can then be returned to operation.

While the repair of a wheel can be quickly and conveniently accomplished at a automotive repair center or gas station, the wheel failure may occur in a remote area where these facilities are not available or are inconvenient to travel to. For example, a motorcycle or all-terrain vehicle may experience a tire failure in a remote region where no tire changing facilities are located. In such a circumstance, the driver is required to take the conventional approach of changing the tire, whereby the tire is patched or replaced while it is on the ground. This approach is very time consuming and uncomfortable.

What is needed is a new system which enables one to repair a wheel in a fast and comfortable manner.

SUMMARY

The present invention provides a vehicle-mounted wheel repair platform that greatly facilitates the changing of a tire in a remote location. In one embodiment, the vehicle-mounted wheel repair platform includes a vehicle connection assembly, a wheel repair platform assembly, and a wheel securing assembly. The vehicle connection assembly includes a horizontal section having a vehicle attachment port for coupling to a vehicle, and a vertical section connected to the horizontal section. The platform assembly includes a vertically-oriented section configured to engage the vertical section of the vehicle connection assembly, and a wheel platform connected to the vertically-oriented section. The wheel securing assembly is coupled to the wheel platform and operable to secure a wheel to the top surface of the wheel platform.

These and other aspects of the invention will be more fully understood when reference is made to the following drawings and detailed description.

Figure 1A:
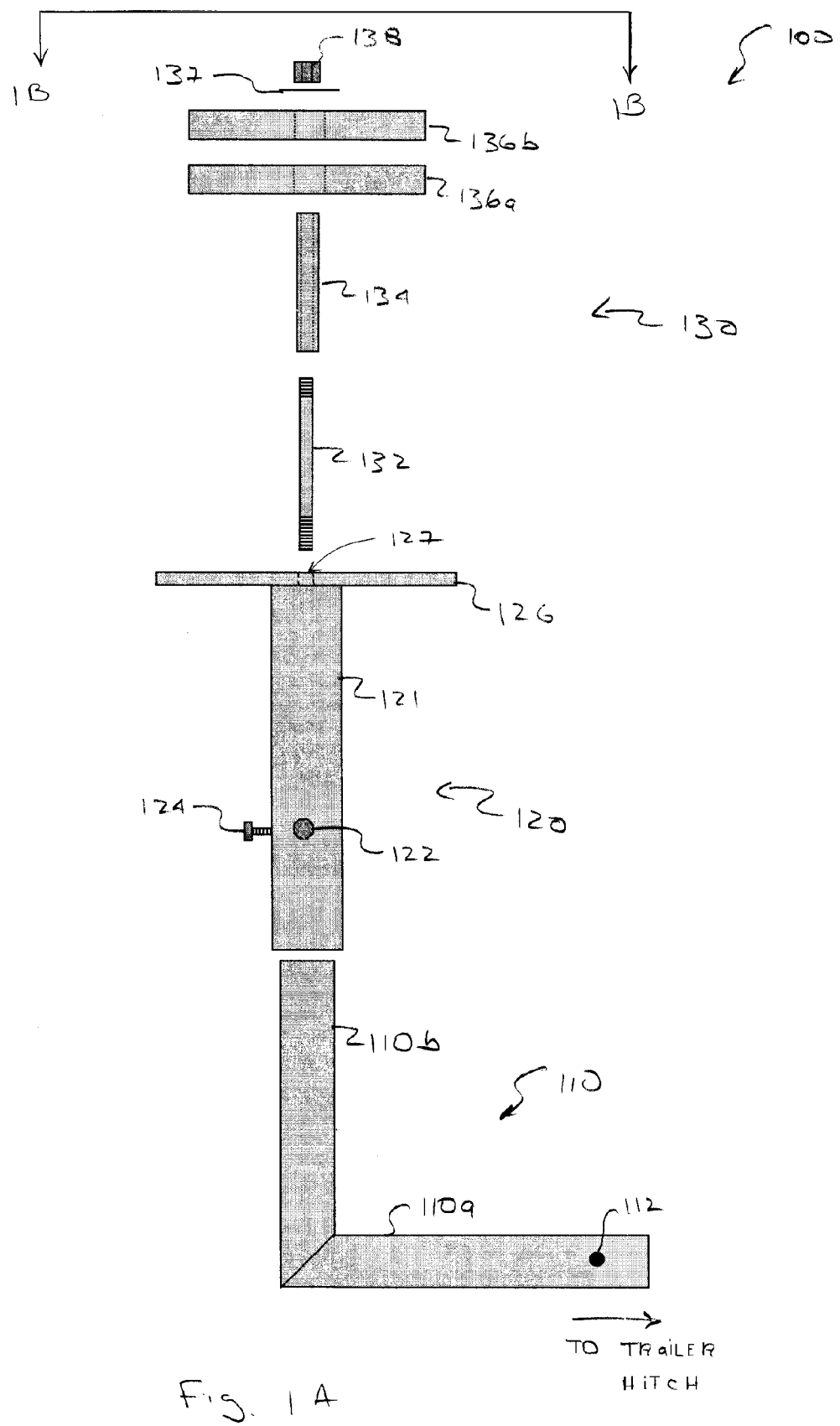
FIG. 1A illustrates a perspective view of the vehicle-mounted wheel repair platform in accordance with one embodiment of the present invention.

For clarity, previously identified features retain their reference numerals in subsequent drawings.

DETAILED DESCRIPTION OF EXEMPLARY EMBODIMENTS

FIG. 1A illustrates a perspective view of an exemplary embodiment of the vehicle-mounted wheel repair platform 100 in accordance with the present invention. The apparatus 100 includes a vehicle connection assembly 110, a platform assembly 120, and a wheel securing assembly 130. The vehicle connection assembly 110 includes a hollow tubular horizontal section 110a which couples to a vehicle, and a vertical section 110b. As used herein, the term "vehicle" refers to any mobile vehicle having sufficient mass to support connection and operation of the vehicle-mounted tire repair platform 100. A non-exhaustive list of such vehicles includes passenger cars, trucks (e.g., passenger and commercial/cargo/freight), buses, off-road vehicles, and the like.

As shown, the horizontal section 110a includes a vehicle attachment port 112 which is operable to couple (directly or indirectly) to the vehicle. In a particular exemplary embodiment, the vehicle attachment port 112 comprises a trailer hitch port configured to accept an axel shaft lock for attachment to a trailer hitch, although the connection may be modified for another type of connection to a vehicle, for example to the vehicle's suspension, bumper, and the like. In particular embodiments, the hollow tubular member 110 is constructed from aluminum or steel, although other materials may be used in alternative embodiments. Further specifically, the horizontal section 110a measures 600 mm long, and the vertical section 110b measures 450 mm. The vehicle attachment port 112 includes a hole sized for connecting to a trailer hitch, and in a particular embodiment measures 17 mm in diameter, the top opening (not shown) measuring 10 mm. The foregoing dimensions and materials are only exemplary, and the invention may be constructed using other materials and components of different sizes under alternative embodiment of the present invention. Exemplary cross-section dimensions of the horizontal and vertical portions 110a and 110b are illustrated in FIG. 5B, below.

The exemplary embodiment of platform assembly 120 includes a vertically-oriented tubular section 121, one or more axel shaft bolts 122 and 124, and a wheel platform 126. The inner dimensions of the tubular section 121 is preferably sized such that it telescopes with the vertically-oriented section 110b, thereby providing a range of different heights at which the mounted tire may be comfortably repaired. Axel shaft bolts 122 and 124 are used to secure section 121 to the hitch connecting section 110*a* at the desire height. The wheel platform 126 is attached to the top of section 121, and is operable to securely support the weight and diameter of the mounted wheel (not shown). The wheel platform 126 may be attached to section 121 using welding other attachment means, or alternatively, the wheel platform 126 may be integrally formed to section 121. In a particular embodiment, the vertically-oriented section 121 is constructed from aluminum or steel and is 40 mm in length. A cross-section view of the vertically-oriented section 121 is described and shown in FIG. 5A, below.

Axel shaft bolts 122 and 124 are offset 90 mm from the bottom of section 121, and comprise ⅜"×16 NC×¾" threading. In one embodiment, the wheel platform 126 comprises a 180 mm diameter disc having a thickness of 7 mm which is welded to the top of section 121. The wheel platform 126 includes a threaded hole 127 which extends through the wheel platform and which operable to accept an axel shaft 132, further described below. The foregoing dimensions and materials are only exemplary, and the invention may be constructed using other materials and components of different sizes under alternative embodiment of the present invention.

The exemplary embodiment of the wheel securing assembly 130 includes an axel shaft 132, an optional sleeve 134, two wheel securing discs 136*a* and 136*b*, a washer 137, and a securing nut 138. As shown, the axel shaft 132 is threaded on each longitudinal end, the bottom threading operable to engage the threaded hole 127 centered on the wheel platform 126. Wheel securing plates 136*a* and 136*b* are used to hold the subject wheel therebetween, each securing plate having a hole through which the axel shaft 132 extends. Preferably, the subject wheel is secured between top and bottom securing plates 136*a* and 136*b* by means of a securing nut 138 internally threaded to engage the top threads of the axel shaft 132. Optionally, a sleeve 134 can be used to more closely fit the hub diameter of the subject wheel, and a washer 137 may be used between the top securing plate 136*b* and the securing nut for a more secure attachment. In a specific embodiment, the axel shaft 132 is constructed from aluminum or steel and measures 200 mm long by 18 mm in diameter with ¾ 10 threading on the top end and ¾ NF threading on the bottom end. Wheel securing plates 136*a* and 136*b* are constructed from aluminum or steel and measure 200 mm in diameter and 13 mm thick with the centered hole measuring 20 mm. In one embodiment in which the axel shaft 132 is welded to the top side of the wheel platform 126, the bottom side of the bottom plate 136*a* is preferably chamfered around the centered hole to provide clearance for welding footprint. The sleeve 134 is constructed from steel and measures 155 mm in length with an outer diameter of 38 mm and an inner diameter of 25 mm. In a particular embodiment of the invention, two or more sleeves of the aforementioned dimension but of varying outer diameters may be supplied with the assembly 100 to fit hub diameters of different size wheels. The washer and securing nut 137 and 138 are constructed from steel, the securing nut 138 being adapted to threadingly engage the top threads of axel shaft 132. In one embodiment, the nut 138 may be a quick-release nut, wing nut, or otherwise shaped so as to be comfortably tightened by hand, thereby permitting the nut's tightening and loosening in a short amount of time. As noted above, the illustrated dimensions and materials are only exemplary, and the invention may be constructed using other materials and components of different sizes under alternative embodiment of the present invention.

Figure 1B:
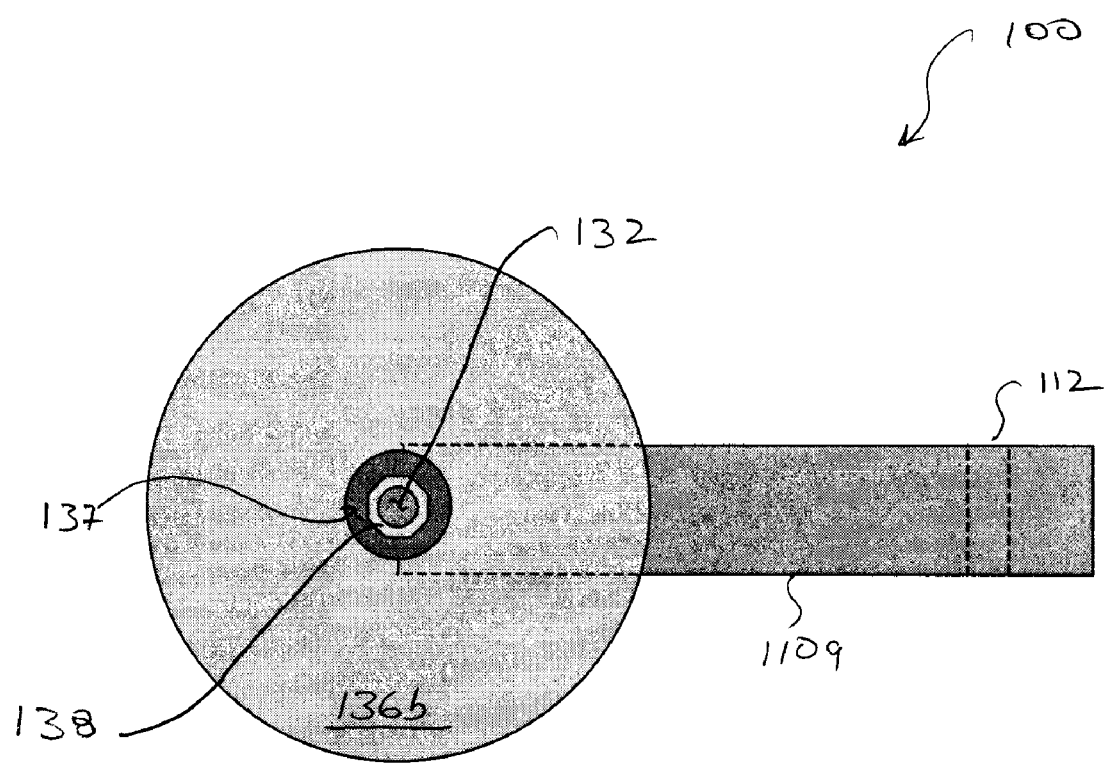
FIG. 1B illustrates a top view of the vehicle-mounted wheel repair platform shown in FIG. 1A.

FIG. 1B illustrates a top view of the apparatus shown in FIG. 1A, with previously identified components retaining their reference numerals. As shown, the washer 137 and securing nut 138 are used to secure the top wheel securing plate 136*b*, by means of engaging the top threads of the axel shaft 132. The horizontal section of the trailer-connecting member 110*a* having the hitch port 112 is also visible from this perspective.

Figure 2:
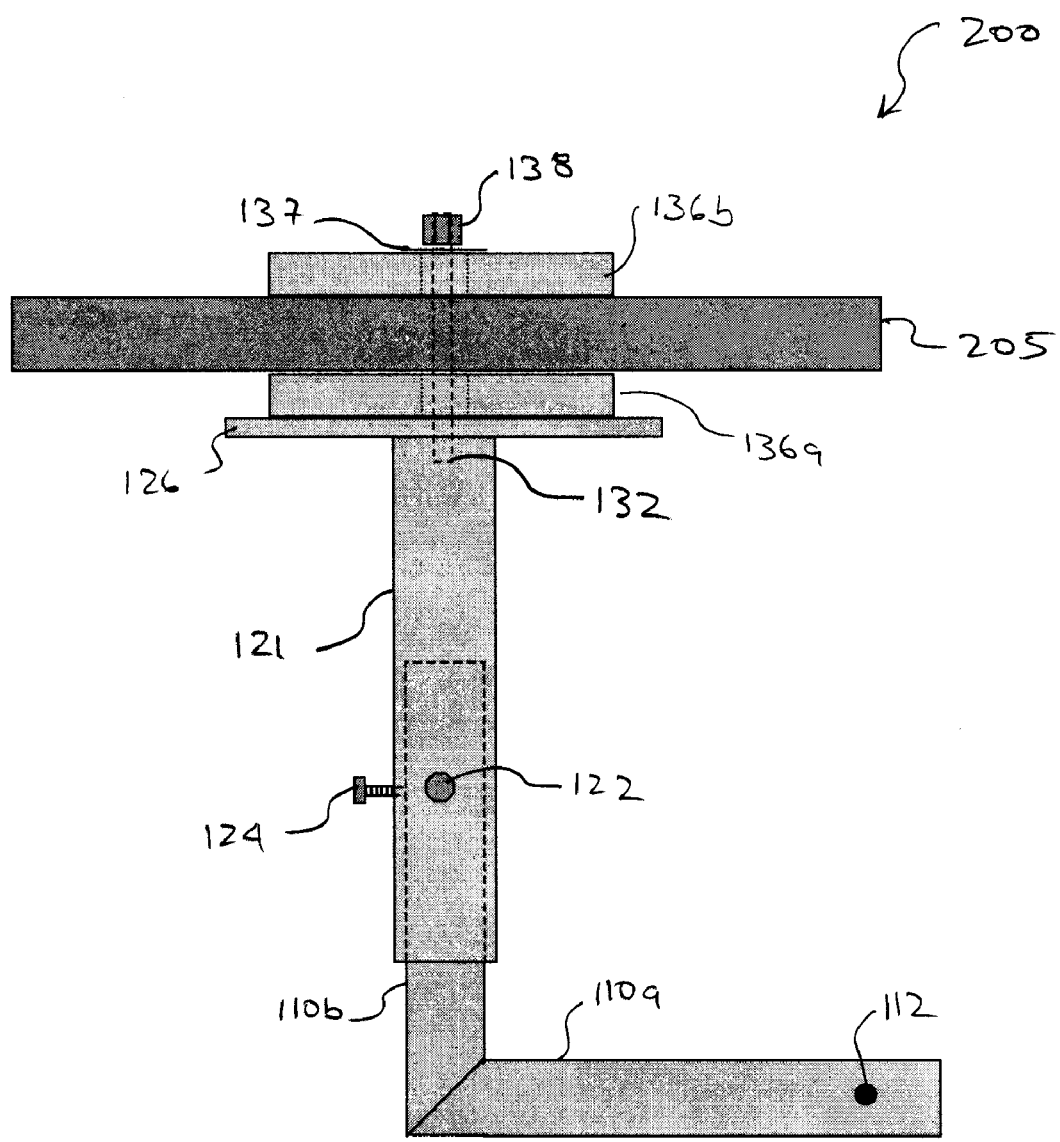
FIG. 2 illustrates a perspective view of the vehicle-mounted wheel repair platform when in use in accordance with one embodiment of the present invention.

FIG. 2 illustrates a perspective view of the vehicle-mounted wheel repair platform when in use, where previously identified components retain their reference numerals. As shown, the subject wheel 205 is secured between the top and bottom plates 136*a* and 136*b* by the securing nut 138. The invention as described in FIGS. 1A, 1B and 2 is constructed to facilitate in the repair of a bicycle or motorcycle wheel, although the size and materials of the system may be modified to accommodate wheels of other sizes. The height of the subject wheel 205 is adjustable by loosening axel shaft nuts 124 and 122, and adjusting the height of section 121. Once secured, wheel repairs, such as tire repair or replacement, can be comfortably performed.

Figure 3A:
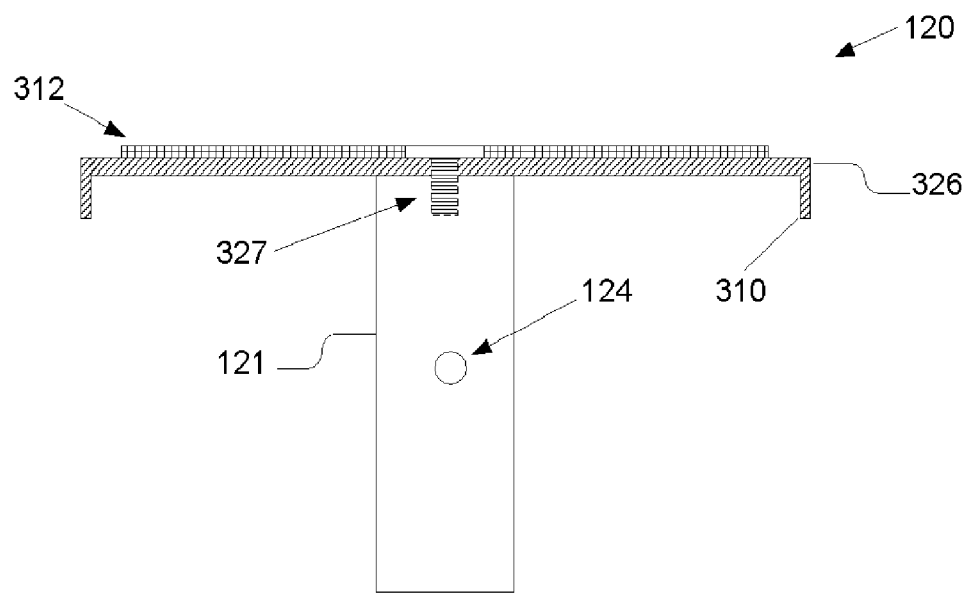
FIG. 3A illustrates a perspective view of a second embodiment of the platform assembly in accordance with the present invention.
Figure 3B:
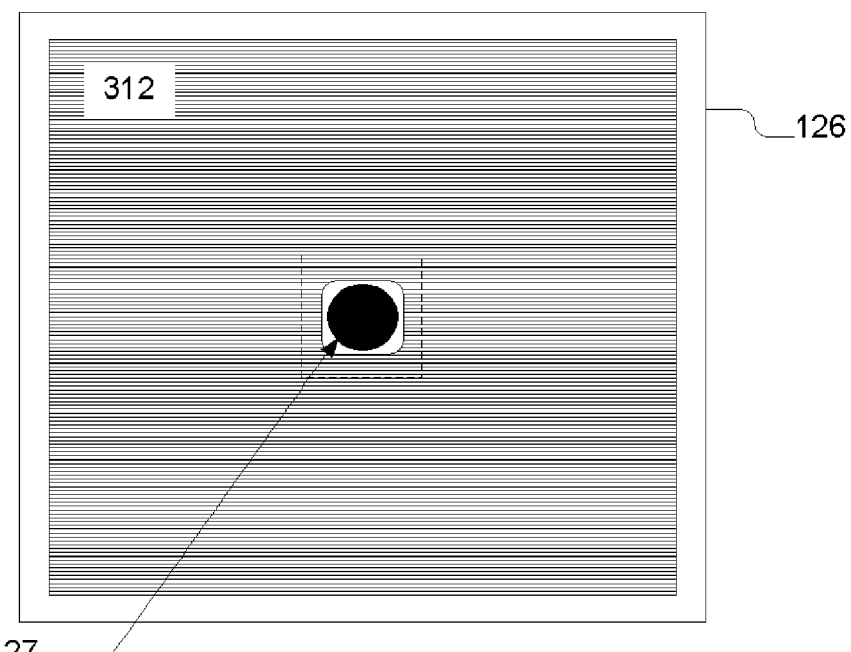
FIG. 3B illustrates a top view of the platform assembly shown in FIG. 3A

FIGS. 3A and 3B illustrate perspective and top views, respectively, of a second embodiment of the platform assembly 120 in accordance with the present invention. In this embodiment, the platform assembly 120 includes a platform 326, two sides of which include downward extending flanges 310. A mat 312 is located on the top surface of the platform 310 and is used to securely hold the tire under repair. The mat may be constructed from rubber or another material useful for securely holding a tire, and may be permanently attached to the platform 326, or removable as a separate piece of the wheel securing assembly 130. A cut-out in the mat 312 exposes a tapped hole 327 disposed in the top surface of the platform 326 for threadingly engaging the axial shaft 132. When a sleeve 134 is used in the wheel securing assembly 130, the mat cut-out is appropriately sized to allow clearance therefore. The platform assembly further includes the previously described tubular section 121 and securing bolts 124 for securing the platform 326 at the most comfortable height for the user. Further one or both of the wheel securing plates 136 may be used to secure a repaired wheel to the platform 326.

The wheel repair platform of the present invention may be used to perform a variety of different wheel repairs. For example, spokes or other parts of a bicycle or motorcycle wheel may be replaced or repaired using the wheel repair platform. In other embodiments, the tire portion and/or inner tube (if any) of the wheel assembly may be removed, patched and re-installed or replaced. These examples represent only a few of the possible wheel repairs for which the apparatus of the present invention can be used, and those skilled in the art will appreciate that many wheel repairs may be performed using the wheel repair platform of the present invention as well.

Figure 4:
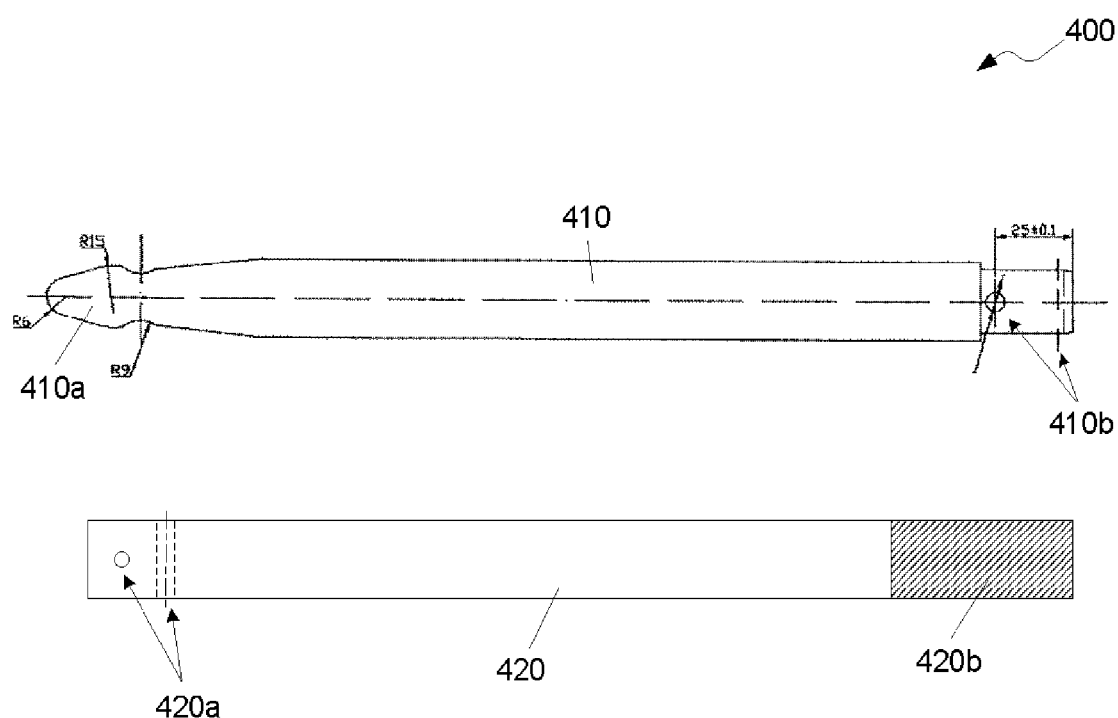
FIG. 4 illustrates a bead breaker hand tool used to remove a tire from the rim of a wheel repaired in accordance with the present invention.

FIG. 4 illustrates a bead breaker hand tool 400 used to remove a tire from the rim of a wheel repaired in accordance with the present invention. The bead breaker 400 includes a bead breaking section 410 and a handle section 420. The bead breaking section 410 includes a tip 410*a* which is inserted between the tire and wheel rim for disengaging the tire from the wheel rim. The bead breaking section 410 further includes two press fit pins 410*b* for insertion into mating pin holes 420*a* of the handle section 420. The handle section 420 further includes a rubber handle portion 420*b* for ease of grip in separating the tire from the wheel rim. Once the bead breaking and handle sections 410 and are assembled together, the repairer directs the bead breaking section 410 between the tire bead and wheel rim. Force is applied along the handle section 420 in the appropriate direction to disengage the tire from wheel rim. Replacement of the tire and/or access to an inner-tube (if present) can be ascertained. The bead breaker 400 is additionally useful in re-engaging the tire with the rim upon tire replacement and/or inner-tube repair. In a particular embodiment, the bead breaking section 410 measures 150 mm in length, and the handle section 420 measures 750 mm in length.

Figure 5A:
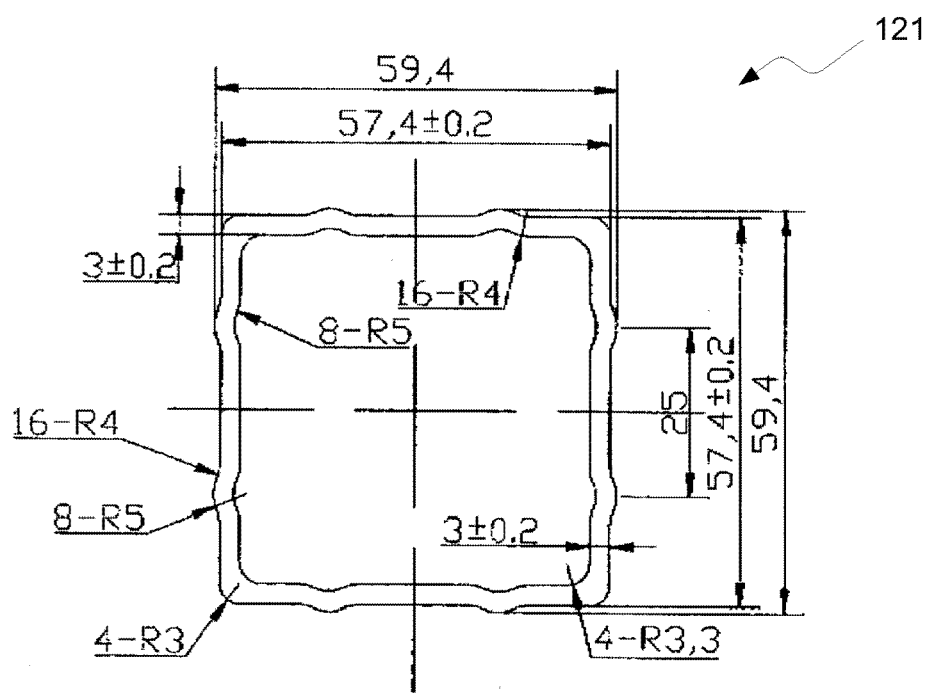
FIG. 5A illustrates a cross-sectional view of the vertical section of the platform assembly in accordance with one embodiment of the present invention.
Figure 5B:
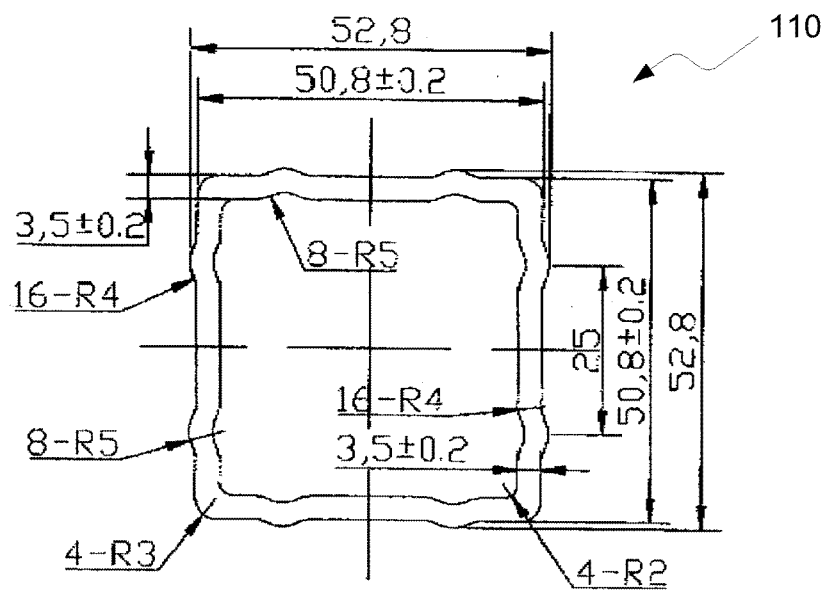
FIG. 5B illustrates a cross-sectional view of the vertical and horizontal sections of the vehicle connection assembly in accordance with one embodiment of the present invention.

FIGS. 5A and 5B illustrate cross-sectional views of tubular sections 121 and 110, respectively in accordance with one embodiment of the present invention. As shown, section 110 is sized to telescope inside section 121, thereby providing an adjustable height to the user.

Those skilled in the art will appreciate that a variety of modifications to the illustrated system are possible in alternative embodiments under the present invention. For example, instead of a wing nut 138, a quick-release component which is removably attached to the uppermost end of the axial shaft 132 may be used to secure the wheel. Further alternatively, a repaired tire may be secured using only a top wheel securing plate (or securing plate of another shape). Still further alternatively, the repaired wheel may be secured to the platform using an alternative wheel securing mechanism known in or obvious from the present art, without the use of a wheel securing plate.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vehicle-mounted wheel repair platform, comprising:
   (i) a vehicle connection assembly, further comprising:
      a horizontal section having a vehicle attachment port for coupling to a vehicle; and
      a vertical section configured for coupling to the horizontal section;
   (ii) a platform assembly, comprising:
      a vertically-oriented section configured to engage the vertical section of the vehicle connection assembly; and
      a wheel platform configured for coupling to the vertically-oriented section, the wheel platform having a top surface for supporting the weight of a wheel applied thereon and a bottom surface; and
   (iii) a wheel securing assembly configured for coupling to the wheel platform and operable to secure a wheel to the top surface of the wheel platform, the wheel securing assembly comprising:
      an axel shaft having a bottom end configured for coupling to the wheel platform and a top end, the axel shaft operable to extend substantially vertically from the wheel platform and through a center hub of wheel placed thereover; and
      top and bottom wheel securing plates, each having a hole therethrough for providing clearance for the axel shaft, the top and bottom wheel securing plates operable to retain a wheel placed therebetween.

2. The vehicle-mounted wheel repair platform of claim 1, wherein the vehicle attachment port comprises a trailer hitch port.

3. The vehicle-mounted wheel repair platform of claim 1, wherein the horizontal and vertical sections of the vehicle connection assembly and the vertically-oriented section of the wheel platform assembly are constructed from steel.

4. The vehicle-mounted wheel repair platform of claim 1, wherein the axel shaft is sized to extend through a center hub of a bicycle wheel, and the wheel securing assembly is sized to secure a bicycle wheel to the top surface of the wheel platform.

5. The vehicle-mounted wheel repair platform of claim 1, wherein the axel shaft is sized to extend through a center hub of a motorcycle wheel, and the wheel securing assembly is sized to secure a motorcycle wheel to the top surface of the wheel platform.

6. The vehicle-mounted wheel repair platform of claim 1, wherein at least one of the vehicle connection assembly, the platform assembly, or the wheel securing assembly is constructed from steel or aluminum.

7. The vehicle-mounted wheel repair platform of claim 1, further comprising a sleeve having an inner diameter sized to receive the axel shaft.

8. The vehicle-mounted wheel repair platform of claim 1, further comprising a bead breaking hand tool for removing a tire from a wheel.

9. A vehicle-mounted wheel repair platform, comprising:
   (i) means for connecting the assembly to a vehicle, further comprising:
      a horizontal section having a vehicle attachment port for coupling to a vehicle; and
      a vertical section connected to the horizontal section;
   (ii) a platform assembly, comprising:
      a vertically-oriented section configured to engage the vertical section of the vehicle connection assembly; and
      a wheel platform configured for coupling to the vertically-oriented section, the wheel platform having a top surface for supporting the weight of a wheel applied thereon and a bottom surface; and
   (iii) a wheel securing means configured for coupling to the wheel platform and operable to secure a wheel to the top surface of the wheel platform the wheel securing means comprising:
      an axel shaft having a bottom end configured for coupling to the wheel platform and a top end, the axel shaft operable to extend substantially vertically from the wheel platform and through a center hub of wheel placed thereover; and
      top and bottom wheel securing plates, each having a hole therethrough for providing clearance for the axel shaft, the top and bottom wheel securing plates operable to retain a wheel placed therebetween.

10. The vehicle-mounted wheel repair platform of claim 9, wherein the axel shaft is sized to extend through a center hub of a bicycle wheel, and the wheel securing assembly is sized to secure a bicycle wheel to the top surface of the wheel platform.

11. The vehicle-mounted wheel repair platform of claim 9, wherein the axel shaft is sized to extend through a center hub of a motorcycle wheel, and the wheel securing assembly is sized to secure a motorcycle wheel to the top surface of the wheel platform.

12. The vehicle-mounted wheel repair platform of claim 9, wherein the vehicle attachment port comprises a trailer hitch port for coupling to a trailer hitch.

13. The vehicle-mounted wheel repair platform of claim 9, wherein at least one of the vehicle connection assembly, the platform assembly, or the wheel securing assembly is constructed from steel or aluminum.

14. The vehicle-mounted wheel repair platform of claim 9, further comprising a sleeve having an inner diameter sized to receive the axel shaft.

15. The vehicle-mounted wheel repair platform of claim 9, further comprising a bead breaking hand tool for removing a tire from a wheel.

16. A vehicle-mounted wheel repair platform, comprising:
(i) a vehicle connection assembly, further comprising:
  a horizontal section having a vehicle attachment port for coupling to a vehicle; and
  a vertical section for connecting to the horizontal section;
(ii) a platform assembly, comprising:
  a vertically-oriented section configured to engage the vertical section of the vehicle connection assembly; and
  a wheel platform for connection to the vertically-oriented section, the wheel platform having a top surface for supporting the weight of a wheel applied thereon and a bottom surface; and
(iii) a wheel securing assembly for connection to the wheel platform and operable to secure a wheel to the top surface of the wheel platform, the wheel securing assembly comprising:
  an axel shaft having a bottom end for connection to the week platform and a top end, the axel shaft configured to extend substantially vertically from the wheel platform and operable to extend through a center hub of wheel placed thereover; and
  top and bottom wheel securing plates, each having a hole therethrough for providing clearance for the axel shaft, the top and bottom wheel securing plates operable to retain a wheel placed therebetween,
wherein at least one of the (i) vehicle connection assembly, (ii) the platform assembly, or the (iii) wheel securing assembly is constructed from steel or aluminum.

17. The vehicle-mounted wheel repair platform of claim 16, wherein the axel shaft is sized to extend through a center hub of a bicycle wheel, and the wheel securing assembly is sized to secure a bicycle wheel to the top surface of the wheel platform.

18. The vehicle-mounted wheel repair platform of claim 16, wherein the axel shaft is sized to extend through a center hub of a motorcycle wheel, and the wheel securing assembly is sized to secure a motorcycle wheel to the top surface of the wheel platform.

19. The vehicle-mounted wheel repair platform of claim 16, further comprising a bead breaking hand tool for removing a tire from a wheel.

20. The vehicle-mounted wheel repair platform of claim 16, wherein the vehicle attachment port comprises a trailer hitch port for coupling to a trailer hitch.

\* \* \* \* \*